(12) United States Patent
Yano et al.

(10) Patent No.: US 6,466,899 B1
(45) Date of Patent: Oct. 15, 2002

(54) NATURAL LANGUAGE DIALOGUE APPARATUS AND METHOD

(75) Inventors: Takehide Yano, Hyogo-ken (JP); Munehiko Sasajima, Hyogo-ken (JP); Yasuyuki Kono, Hyogo-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/525,052

(22) Filed: Mar. 14, 2000

(30) Foreign Application Priority Data

Mar. 15, 1999 (JP) ............................................. 11-069228

(51) Int. Cl.$^7$ ............................ G06F 17/20; G10L 11/00
(52) U.S. Cl. ............................................. 704/1; 704/270
(58) Field of Search ........................ 704/1, 9, 10, 257, 704/270, 275; 707/531, 532, 533; 706/47, 49, 53, 54, 55

(56) References Cited

U.S. PATENT DOCUMENTS

| | | | | |
|---|---|---|---|---|
| 5,694,558 A | * | 12/1997 | Sparks et al. | 345/326 |
| 5,983,200 A | * | 11/1999 | Slotznick | 705/26 |
| 5,999,904 A | * | 12/1999 | Brown et al. | 704/272 |
| 6,035,275 A | * | 3/2000 | Brode et al. | 704/275 |
| 6,044,347 A | * | 3/2000 | Abella et al. | 704/272 |
| 6,073,102 A | * | 6/2000 | Block | 704/275 |
| 6,108,640 A | * | 8/2000 | Slotznick | 705/26 |

* cited by examiner

Primary Examiner—Patrick N. Edouard
(74) Attorney, Agent, or Firm—Oblon, Spivak, McClelland, Maier & Neustadt, P.C.

(57) ABSTRACT

A natural language dialogue apparatus. A blank data memory stores blank data to blank a question element being a decision object for a value of truth or falsehood in a question to ask the value of truth or falsehood. If the input sentence is the question, a question data conversion section estimates the question element in the input sentence, and converts the input sentence to question data in which the question element is blanked by referring to the blank data memory. A problem solution section retrieves a solution for the question element blanked in the question data and generates a response in which an answer for the value of truth or falsehood is not included according to the solution.

34 Claims, 7 Drawing Sheets

QUESTION SENTENCE: "DO I DRIVE THIS LANE? — 701

QUESTION DATA: (YN)(MOVEMENT: DRIVE, (LANE: THIS,) PLACE: A INTERCHANGE) — 702

BLANK DATA: YN → WHICH LINE/LANE SLOT — 703

CONVERTED QUESTION DATA: (WHICH LANE)(MOVEMENT: DRIVE, (LANE: __,) PLACE: A INTERCHANGE) — 704

1. (MOVEMENT: START, PLACE: POINT X) — 801
-----------
n. (MOVEMENT: DRIVE, LANE: LEFT, PLACE: A INTERCHANGE) — 802
n+1. (MOVEMENT: CHANGE, PLACE: A INTERCHANGE, OBJECT: C EXPRESSWAY) — 803
-----------
m. (MOVEMENT: ARRIVE, PLACE: POINT Y) — 804

NATURAL LANGUAGE DIALOGUE APPARATUS AND METHOD

FIELD OF THE INVENTION

The present invention relates to a natural language dialogue apparatus and method to effectively output a response for a question to ask a value of truth or falsehood using natural language from a user.

BACKGROUND OF THE INVENTION

Recently, a natural language interface to accept a natural language input such as speech or text is realized. An expert system using this natural language interface is also developed. Except for the expert system, an apparatus to accept input such as speech or text is utilized as an interface equal to a level of conversation between humans. As an example of this interface, a car navigation system is given. In the car navigation system, a user can operate by his voice during driving. In short, the car navigation system is used as an speech input system of natural language. In case of accepting the natural language input such as speech or text, a computer side must receive various kinds of question formats. As a format of high use frequency in the various kinds of question formats, a question for value of truth or falsehood for the user to confirm some proposition is given. In the question for value of truth or falsehood, the user presents the proposition to be confirmed and asks the truth or falsehood. Content of the proposition is the user's belief or action. Concretely, in case of car navigation task, the following question is given as an example. "Do I drive in this lane?"

In this question, during driving on a road including a plurality of lanes, the user has the intention to confirm whether the present lane is suitable for the next movement such as a right turn or a left turn to arrive at the destination. If the user previously confirms a suitable lane, he need not hurriedly change lanes just before the next movement. As a result, the user is safety during driving increases. Furthermore, the user can drive in safety.

Figure 1:
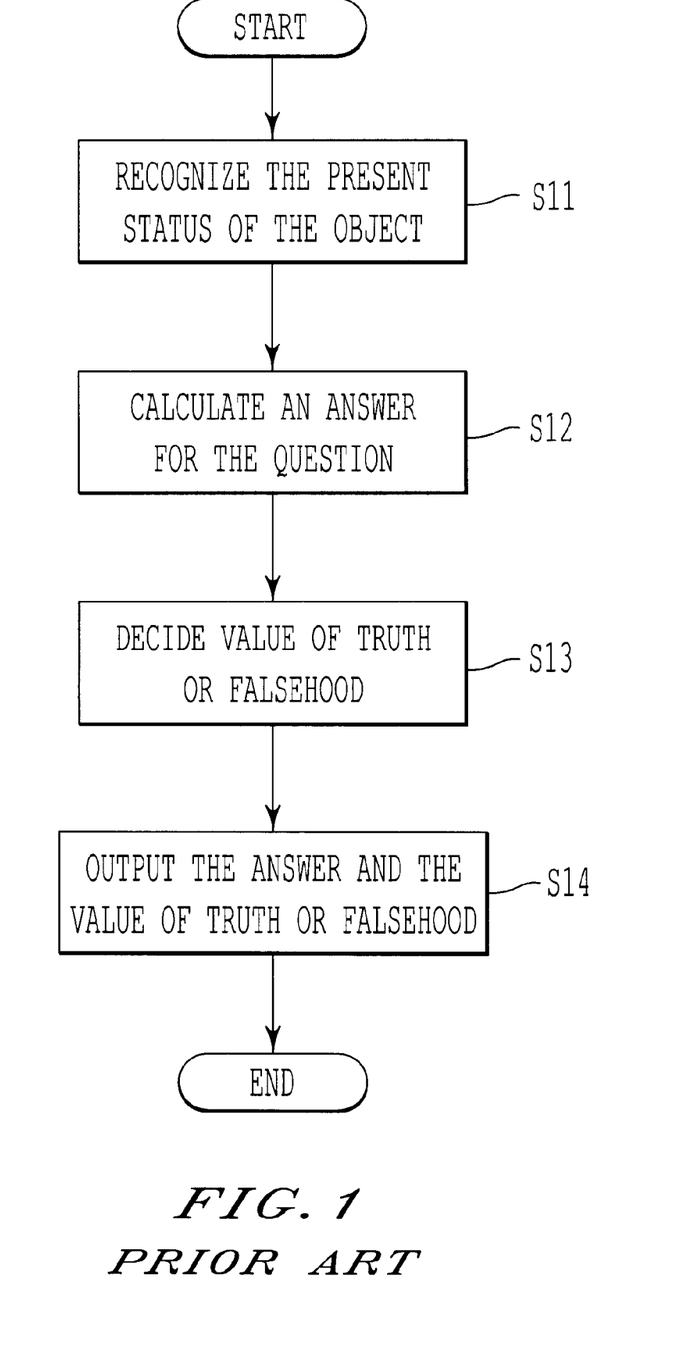
FIG. 1 is a flow chart of reply processing for a question for value of truth or falsehood according to the prior art.

As for the above-mentioned question, a response process of a system for the value of truth or falsehood is explained. FIG. 1 is a flow chart of processing of the system to respond to the value of truth or falsehood according to the prior art.

(1) First, the present lane of car's driving is confirmed in order to recognize "this lane". In short, the present status of the car's driving is recognized (S11).

(2) According to previously known data of the present place, the set course, and the destination, a lane suitable for the next movement is calculated. In short, an answer for the question is calculated (S12).

(3) It is decided whether the present lane recognized at S11 coincides with the suitable lane calculated at S12. According to this decision, a value of truth or falsehood is obtained (S13).

(4) The value of truth or falsehood obtained at S13, and the answer obtained at S12 if necessary, are outputted as response data (S14).

However, above-mentioned prior art includes the following problems. In short, in the prior art, it is difficult to respond to the question for the value of truth or falsehood. The reason is explained as follows.

First, a processing load to confirm the lane in above process (1) is high. In general, in the car navigation system, GPS (Global Positioning System) is used to recognize a position of the car. In accuracy of present GPS, errors such as several meters or several tens of meters occur. Therefore, it is impossible to recognize the lane by GPS. As a result, the present car navigation system can not respond to the above-mentioned question for value of truth or falsehood. In order to confirm this lane, a special sensor is prepared in addition to the components of the car navigation system. However, even if a dialogue apparatus to cope with the question for value of truth or falsehood is realized, the component of the apparatus is expensive. On the other hand, if the natural language dialogue system does not accept the question of value of truth or falsehood, the user can not speak this kind of question at a timing to be confirmed. Accordingly, the quality of the dialogue interface goes down.

Second, in addition to output by retrieving the answer (solution) at S12, a calculation processing to decide whether the answer at S13 corresponds to a value of truth or falsehood of the question must be executed. Therefore, generation processing of response sentence is complicated.

This kind of problem occurs without limitation to the car navigation system. For example, in a load guidance system set on a service area, assume that the user speaks the question of value of truth or falsehood as "Do I drive along this direction to go to the destination?" accompanying his pointing motion to that direction. In order to respond to this question for value of truth or falsehood, "this direction" must be recognized at S11 in FIG. 1. In order to recognize "this direction", a special sensor using technique of image recognition is necessary. As another example, in case the question for value of truth or falsehood as "Do I push this button?" is input to some help system, and the same problem accompanying this question occurs.

As mentioned-above, in natural language dialogue environment of the prior art, in order to reply to the question for value of truth or falsehood, status in which the apparatus is located is necessary to be recognized. Therefore, in addition to recognition of the input natural language, a special device, such as an expensive sensor to recognize the present status, is necessary. As a result, components become complicated and costs increase. Alternatively, even if the sensor is prepared, actual recognition of the status is sometimes impossible according to necessary information.

Furthermore, even if a solution for the question is obtained, in order to reply to the question for value of truth or falsehood, the system must compare the solution with the present status and calculate the value of truth or falsehood according to the comparison result. Therefore, calculation processing load of the system is high.

On the other hand, in case of the natural language dialogue apparatus for not accepting the question for value of truth or falsehood, the user can not speak the question for value of truth or falsehood for a proposition to be confirmed. Therefore, the user interface quality greatly goes down.

SUMMARY OF THE INVENTION

It is an object of the present invention to provide a natural language dialogue apparatus and a method to easily reply to the question for value of truth or falsehood without the recognition of present status and the decision of the value of truth or falsehood.

According to the present invention, there is provided a natural language dialogue apparatus, comprising: input analysis means for analyzing an input sentence of natural language from a user; blank data memory means for storing blank data to blank a question element being a decision object for a value of truth or falsehood in a question to ask the value of truth or falsehood; question data conversion means for deciding whether the input sentence is the question to ask the value of truth or falsehood, for estimating the question element in the input sentence if the input sentence is the question, and for converting the input sentence to question data in which the question element is blanked by referring to said blank data memory means; and problem solution means for retrieving a solution for the question element blanked in the question data, and for generating a response in which an answer for the value of truth or falsehood is not included according to the solution.

Further in accordance with the present invention, there is also provided a method for dialoging by natural language, comprising the steps of: analyzing an input sentence of natural language from a user; storing blank data to blank a question element being a decision object for a value of truth or falsehood in a question to ask the value of truth or falsehood; deciding whether the input sentence is the question to ask the value of truth or falsehood; estimating the question element in the input sentence if the input sentence is the question; converting the input sentence to question data in which the question element is blanked by referring to the blank data; retrieving a solution for the question element blanked in the question data; and generating a response in which an answer for the value of truth or falsehood is not included according to the solution.

Further in accordance with the present invention, there is also provided a computer readable memory containing computer readable instructions, comprising: instruction means for causing a computer to analyze an input sentence of natural language from a user; instruction means for causing a computer to store blank data to blank a question element being a decision object for a value of truth or falsehood in a question to ask the value of truth or falsehood; instruction means for causing a computer to decide whether the input sentence is the question to ask the value of truth or falsehood; instruction means for causing a computer to estimate the question element in the input sentence if the input sentence is the question; instruction means for causing a computer to convert the input sentence to question data in which the question element is blanked by referring to the blank data; instruction means for causing a computer to retrieve a solution for the question element blanked in the question data; and instruction means for causing a computer to generate a response in which an answer for the value of truth or falsehood is not included according to the solution.

DETAILED DESCRIPTION OF THE PREFERRED EMBODIMENTS

Figure 2:
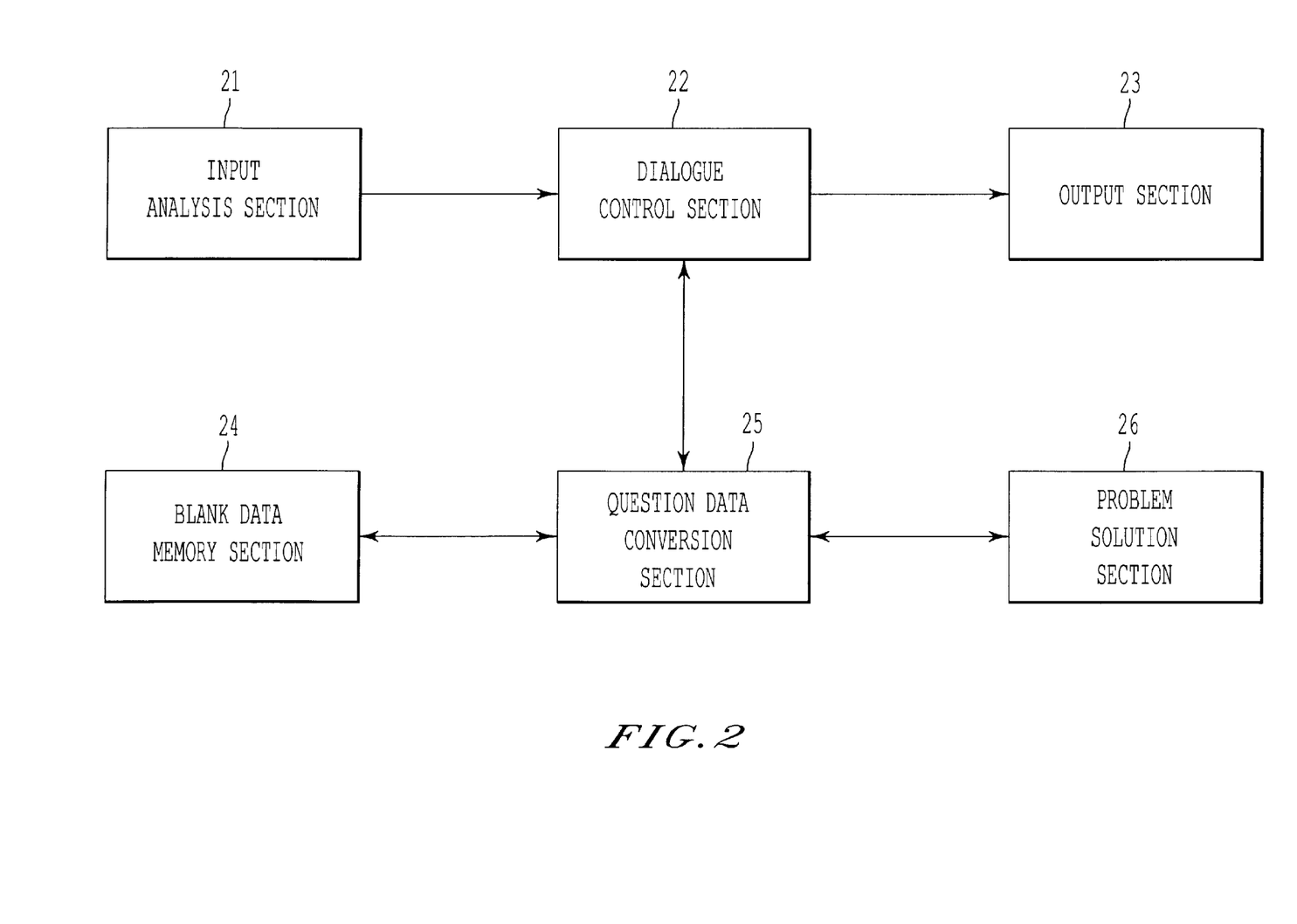
FIG. 2 is a block diagram of the natural language dialogue apparatus according to the present invention.

An embodiment of the present invention is explained by referring to the drawings. In the embodiment, a function to easily and quickly reply to the user's question for a value of truth or falsehood by natural language is presented. FIG. 2 is a block diagram of the natural language dialogue apparatus according to the embodiment. The natural language dialogue apparatus includes an input analysis section 21, a dialogue control section 22, an output section 23, a blank data memory section 24, a question data conversion section 25, and a problem solution section 26. In the natural language dialogue apparatus of this embodiment, an input question of natural language from the user is accepted and a reply processing based on data from the problem solution section 26 is executed.

The input analysis section 21 analyzes input data from the user and converts the input data to another data used by the system to execute various kinds of jobs for the user. As the analysis processing and conversion processing, techniques such as speech/text recognition processing by well-known pattern matching are suitably used.

The dialogue control section 22 determines motion of the system based on converted input data. In addition to this, the dialogue control section 22 understands the context of dialogue consisting of a series of input data and estimates an intention of a user's utterance based on the input data. If some problem-solution is necessary to reply to the input data, the dialogue control section 22 generates question data in order to generate answer data including the solution. This question data is outputted to the question data conversion section 25.

Figure 3A:
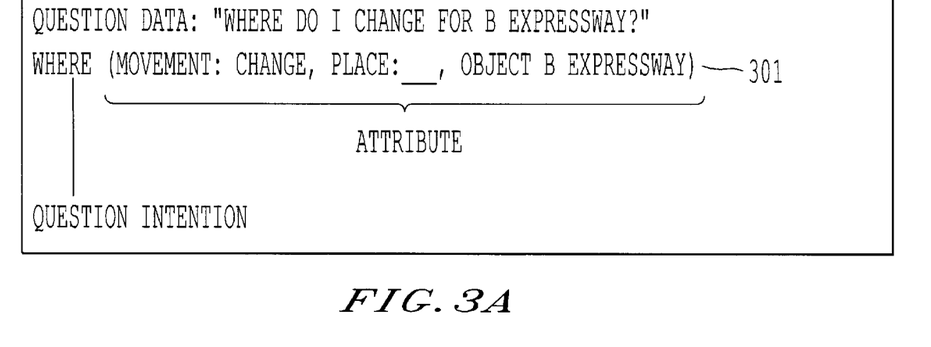
FIGS. 3A and 3B are schematic diagrams of question data and reply data analyzed according to the present invention.
Figure 3B:
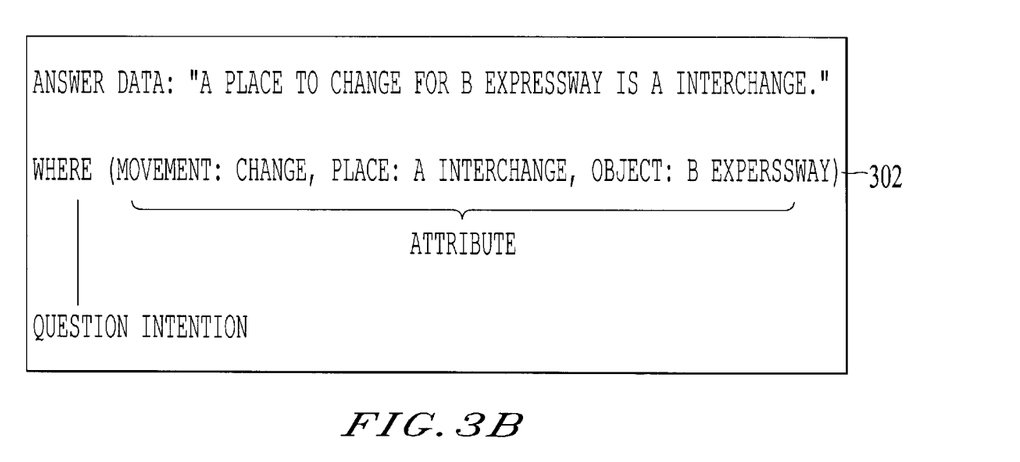

Next, detail of the question data and the answer data is explained. FIG. 3A shows one example of the question data, and FIG. 3B shows one example of answer data obtained from the problem solution section 26 for the question data shown in FIG. 3A. As shown in FIG. 3A, the question data 301 is generated by analyzing a question sentence "Where do I change for B expressway?". On the other hand, as shown in FIG. 3B, the answer data 302 corresponds to an answer sentence "A place to change for B expressway is A interchange.". As for the question data and the answer data, a question intention is respectively added and the text is divided into each attribute. The question intention represents a kind of data necessary for the user. The problem solution section 26 determines a retrieval method based on the question intention. As shown in FIG. 3A, the question data 301 represents a question for place because the question intention is "Where". As another question intention, for example, "YN" representing a question for value of truth or falsehood, "Which Line" representing a question for lane, "Which Way" representing a question for driving load, are given. "ATTRIBUTE" represents a key to retrieve the data. As shown in the question data 301 and the answer data 302, one part paused by a comma (",") is called a slot. In each slot, the attribute data ("movement", "place", "object" in FIGS. 3A and 3B) is stored. In the question data 301, attribute data "change" is stored in slot "movement", and attribute data "B expressway" is stored in slot "object". On the other hand, an underline ("_") of slot "place" represents non-existence of attribute data (the attribute data is blank). If this question data 301 is supplied to the problem solution section 26, the answer data 302 of which the attribute data "A interchange" is given in slot "place" is obtained.

Next, the output section 23 outputs the text data indicated by the dialogue control section 22 as a predetermined format. The problem solution section 26 previously stores knowledge for each task and outputs the answer for input question. The problem solution section 26 may be composed as one kind of database.

The question data conversion section 25 receives the question data from the dialogue control section 22, and converts the question data based on the blank data stored in the blank data memory section 24 if the question data is a question for value of truth or falsehood. After converting the question data, the question data conversion section 25 supplies the converted question data to the problem solution section 26 and supplies the answer obtained from the problem solution section 26 to the dialogue control section 22. Furthermore, the question data conversion section 25 includes a buffer to store the question data and retrieval index information used for retrieving the blank data memory section 24.

Figure 4:
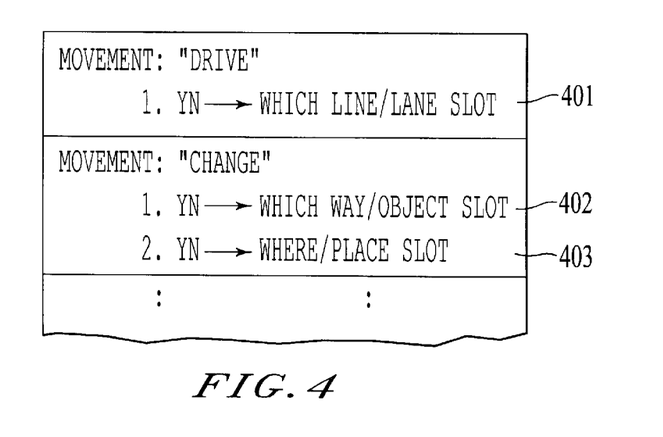
FIG. 4 is a schematic diagram of blank data stored in a blank data memory section in FIG. 2.

The blank data memory section 24 previously stores the blank data as retrievable format for the question data conversion section 25. FIG. 4 shows one example of the blank data registered in the blank data memory section 24. In FIG. 4, rules 401, 402, 403 respectively correspond to the blank data. As retrieval tag data, "MOVEMENT" data and index (1, 2, . . . ) representing priority order is assigned to each blank data.

The blank data represents that a question intention of the question data is converted and a content of the slot is blanked. For example, the blank data 401 represents that the question intention "YN" is converted to "Which Line" and the slot "Lane" is blanked. In this case, the retrieval tag data need not always be "MOVEMENT" data. For example, in order to cope with a proposition not including movement element, other attribute based on format of the question data may be used as the retrieval tag data. An element being the retrieval tag may be the object to be blanked.

Figure 5:
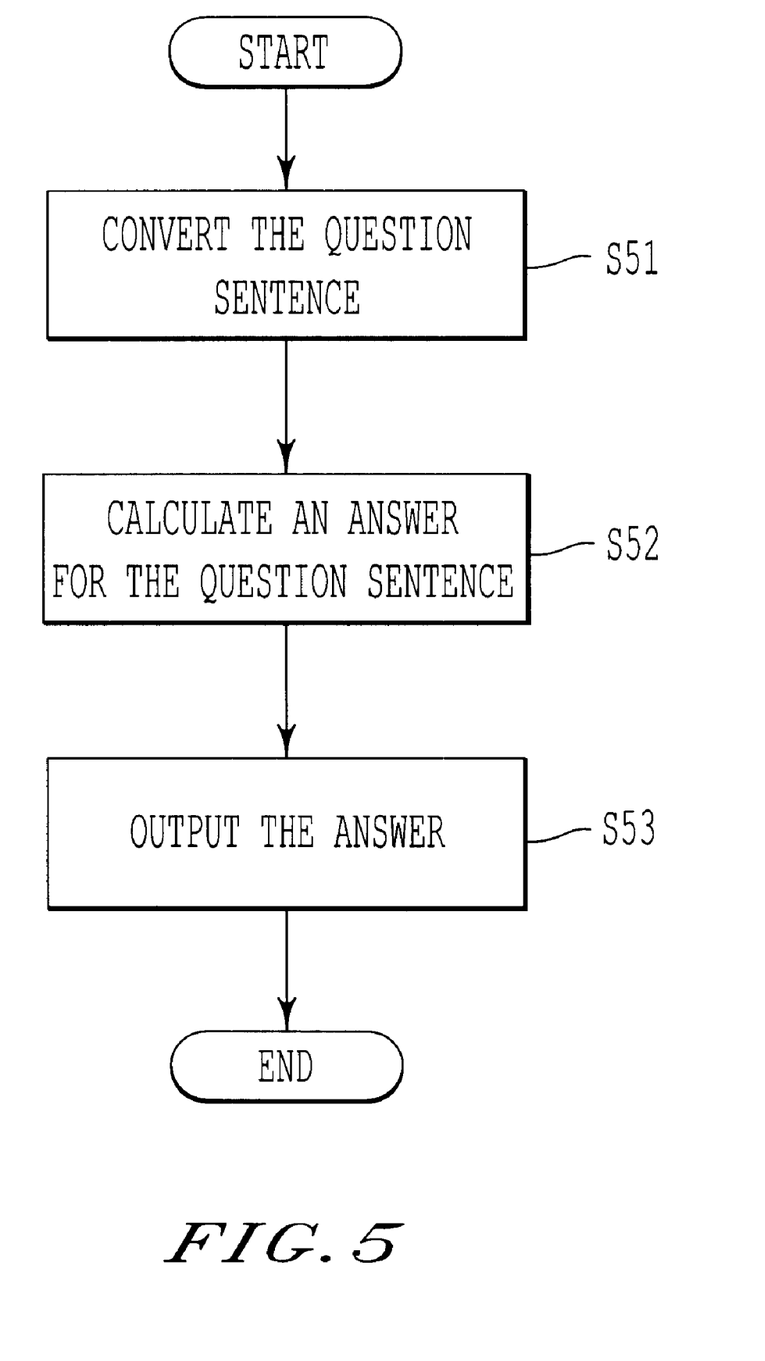
FIG. 5 is a flow chart of reply processing for a question for value of truth or falsehood according to the present invention.

Next, a detail processing of the question data conversion section 25 is explained by referring to FIGS. 5~8. FIG. 5 is a flow chart of basic processing of the embodiment. As shown in FIG. 5, the question data conversion section 25 converts the question data input from the dialogue control section 22 to question data not including the value of truth or falsehood (S51). By conversion of the question data, a recognition of present status and a decision of the value of truth or falsehood are not necessary. Based on the converted question data, the question data conversion section 25 retrieves a solution of proposition for the question data using the problem solution section 26 (S52). The answer is generated based on the solution and outputted by the output section 23 (S53).

Figure 6:
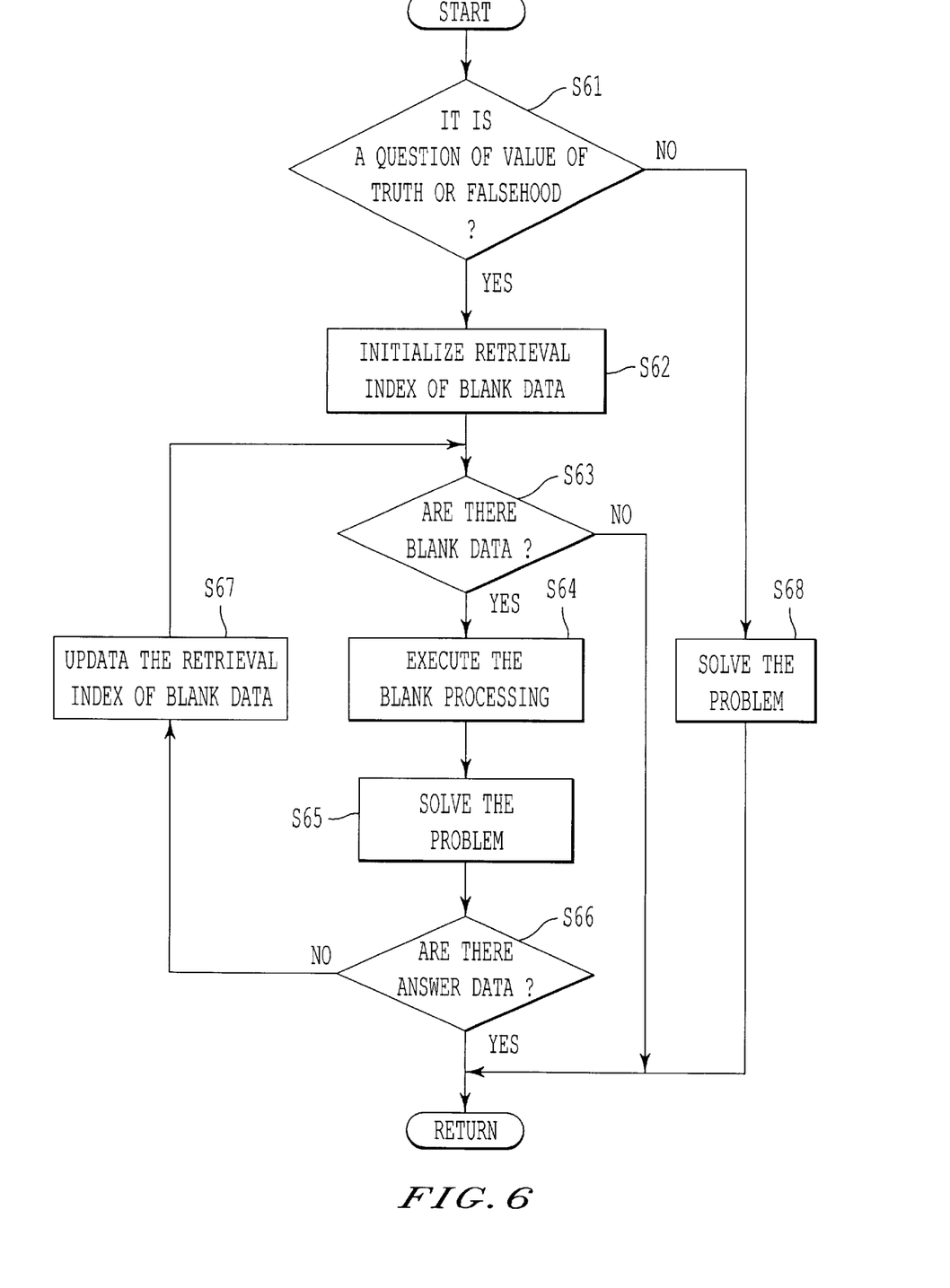
FIG. 6 is a flow chart of processing of a question data conversion section 25 in FIG. 2.

FIG. 6 is a flow chart of detail processing of the question data conversion section 25. First, it is decided whether the question data input to the question data conversion section 25 is a question for value of truth or falsehood (S61). In case of non-question of value of truth or falsehood (NO at S61), the process is forwarded to S68. In case of the question of value of truth or falsehood (Yes at S61), the process is forwarded to S62. In this case, the question data is stored in a buffer and a retrieval index to retrieve the blank data memory section 24 is initialized (S62). The blank data in the blank data memory section 24 is retrieved using the retrieval index (S63). In this case, it is decided whether the corresponding blank data is stored in the blank data memory section 24. In case of non-existence of the blank data (No at S63), the processing is completed as no-solution. In case of existence of the blank data (Yes at S63), the processing is forwarded to S64. The question data stored in a buffer of the question data conversion section 25 is converted to question data to be supplied to the problem solution section 26 according to the blank data obtained.

Figure 7:
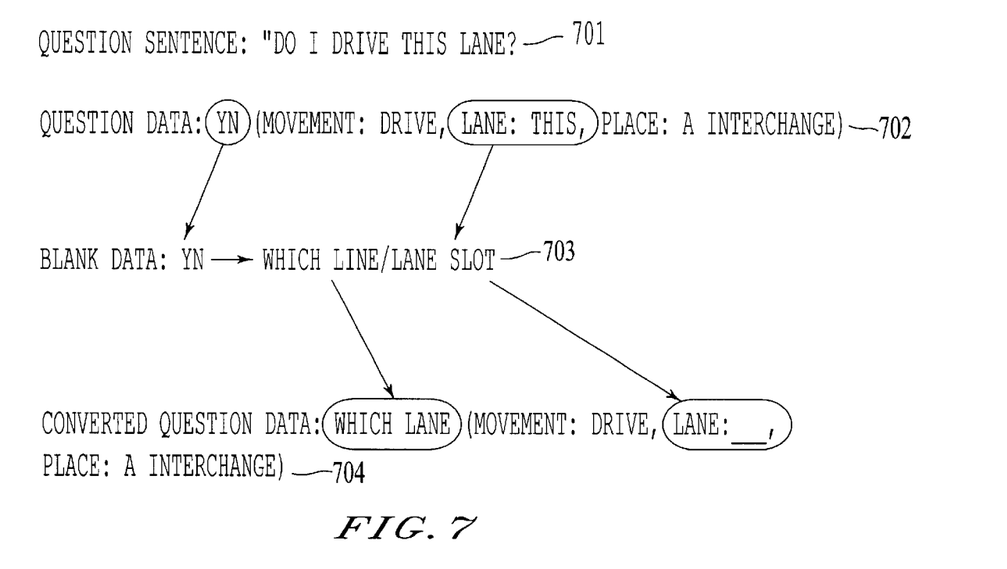
FIG. 7 is a schematic diagram of conversion processing of a question sentence by the question data conversion section 25 according to the present invention.
Figure 8:
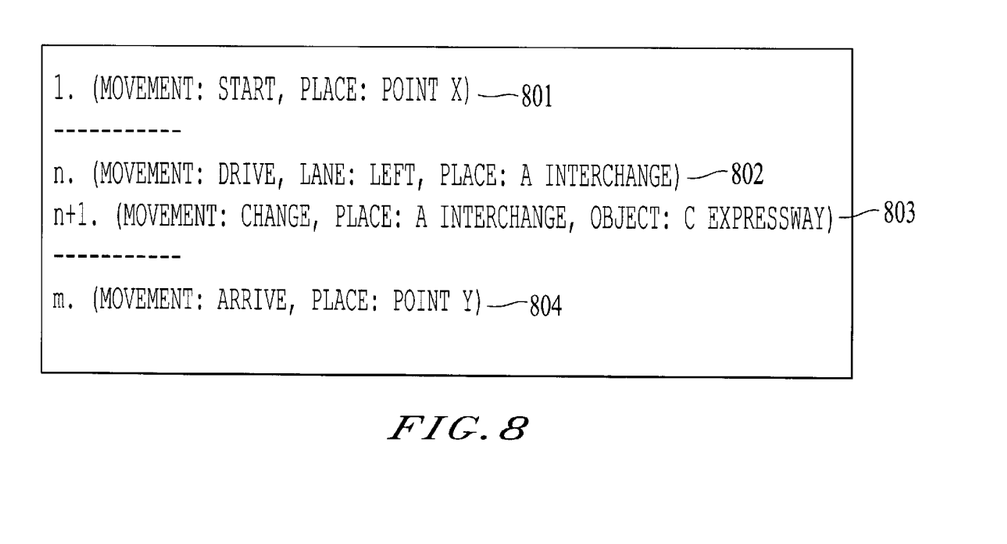
FIG. 8 is a schematic diagram of an example of set course data of car navigation to coincide the question data according to the present invention.

The conversion processing of the question data is now explained by referring to FIG. 7. A question sentence 701 "Do I drive in this lane?" input to the input analysis section 21 is supplied from the dialogue control section 22 as the question data 702. In this question data 702, the question intention is "YN" representing a question for value of truth or falsehood. The question data conversion section 25 retrieves the blank data memory section 24 by the movement tag "drive" as a retrieval key. The blank data 703 corresponding to movement tag "drive" is retrieved from the blank data memory section 24. Based on this blank data 703, the question data conversion section 25 converts the question intention of the question data 702 from "YN" to "Which Line", and blanks the slot "lane". In this way, new question data 704 is generated. In short, as shown in FIG. 7, the question intention in the question data is converted based on the blank data, and the slot in which the answer is given by the question intention is made blank.

After obtaining new question data 704, the new question data is supplied to the problem solution section 26 in order to obtain the answer (S65). It is decided whether the answer is obtained from the problem solution section 26 (S66). In case of obtaining the answer (Yes at S66), the processing is forwarded to "Return". In case of not obtaining the answer (No at S66), the processing is forwarded to S67. In this case, the retrieval index of blank data is updated by 1 (S67). After all processing is completed (Return), the question data conversion section 25 supplies the obtained solution and the converted question data to the dialogue control section 22. In this case, a format of the question is not a format of value of truth or falsehood but a format of another intention. In response to this input, the dialogue control section 22 creates the answer data based on the solution and the converted question data, and supplies it to the output section 23. This answer data is created by assigning the solution to the blanked slot in the converted question data. In this creation processing of the answer data, the question data conversion section 25 may directly create the answer data and supply it to the dialogue control section 22 in case of simple question and solution.

Hereinafter, an example of the conversion processing of the question is explained. In this example, a car navigation task is explained by referring to FIGS. 4, 7, and 8. In this case, a position of the user's car is supplied from GPS and unified with the question data by the dialogue control section 22. The blank data memory section 24 previously stores information shown in FIG. 4. The problem solution section 26 previously stores the set course data "start at point X, drive on left side lane to A interchange, change to C expressway at A interchange, and arrive to point Y" shown in FIG. 8.

(1) In case of input of question sentence 1 "Do I drive in this lane?"

In this case, the question data given by the dialogue control section 22 is unified with GPS data, and supplied to the question data conversion section 25 as following status.

YN(movement:drive, lane:this, place:A interchange)

Hereinafter, detail processing of this embodiment is explained by referring to FIG. 6. At S61, the question sentence is decided as the question for value of truth or falsehood because the question intention is "YN", and the processing is forwarded to S62. At S62, the question data is stored in the buffer and the retrieval index of blank data is initialized as "1". The processing is forwarded to S63. At S63, the blank data is retrieved from the blank data memory section 24 by the movement slot "drive" and the retrieval index "1" as the retrieval key. As a result, the blank data 401 is obtained and the processing is forwarded to S64. At S64, the conversion processing of the question data is executed based on the question data in the buffer and the blank data 401 as shown in FIG. 7. As a result, the question data is represented as follows.

Which Line (movement:drive, lane:_, place:A interchange)

At S65, the converted question data is supplied to the problem solution section 26. This question data is compared with the set course data 802 in FIG. 8, and the lane slot is obtained as the answer data as follows.

Which Line (movement:drive, lane:left, place:A interchange)

At S66, this answer data is supplied to the dialogue control section 22 and the processing is completed.

The dialogue control section 22 receives the answer data. In this case, the dialogue control section 22 controls the dialogue processing without consciousness of the question data conversion processing executed by the question data conversion section 25. In short, the dialogue control section 22 can execute in same way of the case that the question data of the question intention "Which Line" is initially given to the question data conversion section 25, and the answer data for the question data is obtained. As a result, the following response without the value of truth or falsehood is created.

"You drive in the left lane at A interchange".

If the user is driving in the right lane, this answer urges the user to change to the left lane. If the user is driving in the left lane, this answer is regarded as a confirmation of acceptance of this lane. Accordingly, even if an answer as the value of truth or falsehood is not presented to the user, the user's desired information can be presented.

On the other hand, if the value of truth or falsehood is presented as the answer to the user, a step to decide whether a proposition is correct is necessary. As a premise of this decision, the system must recognize "this" lane as either of left lane or right lane. In order to recognize "this" lane, a special sensor (for example, high image recognition) not in present car navigation systems is necessary.

As mentioned-above, the question data conversion section 25 converts the question data to new question data not including the value of truth or falsehood and blanks the slot containing a decision object of the value of truth or falsehood. Accordingly, a fact related with the question data is responded without consideration of the value of truth or falsehood. As a result, the confirmation step of the proposition is omitted. Furthermore, if only knowledge of the correct lane is previously given to the problem solution section 26, another component is not necessary for the system. In short, the answer equal to an answer accompanying the value of truth or falsehood is presented to the user.

(2) In case of input of question sentence 2 "Do I change to C expressway at B interchange?"

In this case, the question data given by the dialogue control section 22 is supplied to the question data conversion section 25 as following status.

YN (movement:change, place:B interchange, object:C expressway)

Hereinafter, detail processing of this embodiment is explained by referring to FIG. 6. At S61, the question sentence is decided as the question for value of truth or falsehood because the question intention is "YN", and the processing is forwarded to S62. At S62, the question data is stored in the buffer and the retrieval index of blank data is initialized as "1". The processing is forwarded to S63. At S63, the blank data is retrieved from the blank data memory section 24 by the movement slot "change" and the retrieval index "1" as the retrieval key. As a result, the blank data 402 of high index (priority order 1) is obtained from a plurality of blank data of movement tag "change" in FIG. 4 and the processing is forwarded to S64. At S64, the conversion processing of the question data is executed based on the question data in the buffer and the blank data 402. This conversion processing is executed in the same way as in FIG. 7. As a result, converted question data is represented as follows.

Which Way (movement:change, place:B interchange, object:_)

At S65, this converted question data is supplied to the problem solution section 26. In this case, the converted question data is not matched with the set course data in FIG. 8 and the solution is not obtained. At S66, the answer is not obtained and the processing is forwarded to S67. At S67, the retrieval index of blank data is updated as "2" and the processing is forwarded to S63. At S63, the blank data is retrieved from the blank data memory section 24 by the movement slot "change" of the question data and the retrieval index "2" of blank data as the retrieval key. As a result, the blank data 403 in FIG. 4 is obtained and the processing is forwarded to S64. At S64, the conversion processing of the question data is executed using the question data and the blank data 403 stored in the buffer. This processing is executed in the same way as in FIG. 7. As a result, the question data is obtained as follows.

Where (movement:change, place:_, object:C expressway)

At S65, this converted question data is supplied to the problem solution section 26. This question data is matched with the navigation data 803 in FIG. 8, and the following data is obtained as the solution.

Where (movement:change, place:A interchange, object:C expressway)

At S66, the above answer data is supplied to the dialogue control section 22, and processing is completed.

The dialogue control section 22 receives the answer data. In this case, the dialogue control section 22 controls the dialogue processing with no connection to the conversion processing of the question data conversion section 25. In short, the dialogue control section 22 can execute the processing in the same way as the case that the question data of question intention "Where" is supplied from the beginning and the question data is obtained.

As a result, following response without the value of truth or falsehood is generated.

"The place to change to C expressway is A interchange."

This response points out the users mistaken belief that the place to change to the C expressway is the B interchange by informing the use of the A interchange. Alternatively, at a timing to fail in problem solution, the information without the solution may be supplied to the dialogue control section 22. In this case, the following response is presented.

"The place to change to the C expressway is not B interchange."

In short, even if the solution is not obtained, the retrieval processing is repeatedly executed by blanking another slot in the question data and "A interchange" is informed to the user. Therefore, the interface is not troublesome and naturally useful information is presented.

As mentioned-above, in the present invention, the question data conversion section 25 converts the question data as the question intention without the value of truth or falsehood and blanks a slot containing the object to decide the value of truth or falsehood. The question data conversion section 25 creates the answer data based on the converted question data not including the value of truth or falsehood. Therefore, in a natural language dialogue processing apparatus for accepting the question for value of truth or falsehood, another component necessary for solving the question for the value of truth or falsehood is not necessary and cost of the apparatus is reduced. In short, a response for the question for the value of truth or falsehood is presented without complicated component. Simultaneously, as for the question data including the value of truth or falsehood, the response is outputted by omitting step of confirming the value of truth or falsehood. Accordingly, a load of the system is reduced, various kinds of questions are flexibly processed, and a dialogue between the user and the system is smoothly realized.

In the above-mentioned example, a format of car navigation system is explained. However, the natural language processing apparatus of the present invention is not limited to this example. In case of the apparatus for accepting natural language input without regard to input format such as speech or text, arbitrary apparatus such as expert system may be used.

In above-mentioned example, English is used as the input language. However, the input analysis section 21 may convert to any arbitrary format of knowledge representation understandable by the dialogue control section 22. In short, arbitrary language is used as the processing object.

In the above-mentioned example, the user's input text does not contain an omission and all necessary data is included in a slot of the question data. However, the present invention is applied to various kinds of natural language input. For example, by preparing the context processing function for the dialogue control section 22, omission data is supplemented from the context in case the input data includes omission. On the other hand, even if the dialogue control section 22 does not prepare the context processing function, the question data including the blank slot is supplied to the question data conversion section 25, and the problem solution section 26 retrieves the answer by using a few key. In this case, if the problem solution section 26 outputs a large number of answer data, the question data conversion section 25 informs the dialogue control section 22 of the large number of answer data. By this informing, the dialogue control section 22 can execute various applications such as asking again for obtaining further necessary data.

In the above-mentioned example, as shown in FIG. 4, a plurality of blank data are prepared. However, the blank data may be changed to fixed data. In this case, if the question data conversion section 25 fails in the problem solution, the question data conversion section 25 can execute the processing equivalent to a status not retrieving next blank data.

Furthermore, in the above-mentioned example, the question data conversion section 25 and the blank data memory section 24 are independently defined as separate sections in order to easily understand. However, these sections may be included in the dialogue control section 22 and the problem solution section 26.

Furthermore, in the above-mentioned example, the problem solution section 26 is composed as a database format of internal apparatus in the natural language dialogue apparatus. However, the present invention is not limited to this component. The problem solution section 26 may be composed as an apparatus for retrieving outside database. Alternatively, the problem solution section 26 itself may be existed in outside of the natural language dialogue apparatus and obtain the information through a network.

Figure 9:
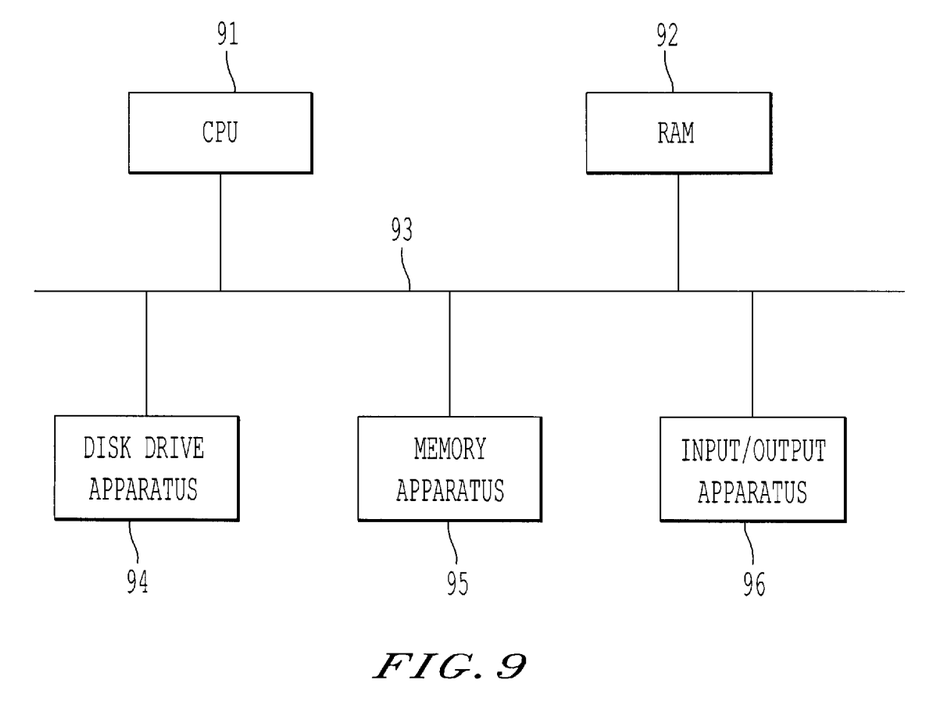
FIG. 9 is a block diagram of hardware to load the natural language dialogue method according to the present invention.

Next, a hardware component of the present invention is explained. The natural language dialogue apparatus of the present invention may be equipped with various kinds of hardware apparatus or as a software by creating program to realize processing of the present invention. FIG. 9 is a block diagram of hardware in case the present invention is equipped to a general purpose computer. The hardware of the natural language dialogue apparatus of the present invention includes a CPU 91, a RAM 92 to store program and necessary data, a disk drive apparatus 94, a memory apparatus 95, and an input/output apparatus 96. These apparatuses are mutually connected by a bus 93. In FIG. 2, the input analysis section 21, the dialogue control section 22, the output section 23, the blank data memory section 24, the question data conversion section 25, and the problem solution section 26 are respectively comprised by a program describing each processing step. In this case, each data stored in the blank data memory section 24 and the problem solution section 26 may be composed with the program as one unit, or independently stored for the program in order to access from the program.

The program describing these processing steps is stored in RAM 92 as a program to control a computer system in FIG. 9 and executed by CPU 91. CPU 91 executes a calculation and a control of the memory apparatus 95 and input/output apparatus 96 according to steps of the program stored in RAM 92. In this way, the function presented by the natural language dialogue apparatus is realized.

In order to install the program in RAM 92, various methods are selectively used. For example, first, the above-mentioned program to realize each processing of the present invention (the program describing the processing steps of the input analysis section 21, the dialogue control section 22, the output section 23, the blank data memory section 24, the question data conversion section 25, and the problem solution section 26 to control the computer system) is stored in a memory medium readable by the computer. In FIG. 9, the disk drive apparatus 94 corresponding to each memory medium reads out the program in the memory medium and stores the program in RAM 92. Alternatively, the program may be temporarily stored in the disk drive apparatus 94 and transferred from the disk drive apparatus 94 to RAM 92 in case of execution. The program stored in RAM 92 is read out and executed by CPU 91 in order to realize the function of the present invention. In this case, the memory medium is, for example, a semiconductor memory, a magnetic disk (floppy disk, hard disk), an optical disk (CD-ROM, DVD), or all of the apparatus for recording the program. In case the memory medium storing the program is an IC card, the program is readable using an IC card reader. Furthermore, the program is received from a predetermined interface apparatus through the network.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A natural language dialogue apparatus, comprising:
   input analysis means for analyzing an input sentence of natural language from a user;
   blank data memory means for storing a plurality of blank data each including a retrieval key element and a blank object element for a question to ask a value of truth or falsehood, the blank object element representing a kind of object to be recognized;
   question data conversion means for deciding whether the input sentence is a question to ask the value of truth or falsehood, for estimating an object to be recognized in the input sentence if the input sentence is the question to ask the value of truth or falsehood, for retrieving the blank data in which the retrieval key element is included in the input sentence from said blank data memory means, and for converting the input sentence to question data in which the object is blanked by referring to the blank object element of the retrieved blank data; and
   problem solution means for retrieving a solution for the object blanked in the question data and for generating a response in which the solution is included and an answer for the value of truth or falsehood is not included.

2. The natural language dialogue apparatus according to claim 1,
   wherein said blank data memory means stores a plurality of the blank data each including a question intention element and the blank object element corresponding to the retrieval key element, the retrieval key element representing a slot of arbitrary kind in the input sentence, the question intention element representing a kind of data necessary for the user in relation to the blank object element.

3. The natural language dialogue apparatus according to claim 2,
   wherein said blank data memory means stores a plurality of the blank data corresponding to the same retrieval key element in order of priority, each blank data including the question intention element and the blank object element.

4. The natural language dialogue apparatus according to claim 3,
   wherein said question data conversion means divides the input sentence into a plurality of slots of each kind if the input sentence is the question to ask the value of truth or falsehood.

5. The natural language dialogue apparatus according to claim 4,
   wherein said question data conversion means retrieves the blank data corresponding to the retrieval key element that coincides with one slot in the input sentence from said blank data memory means, blanks another slot in the input sentence of which the kind is the same as the blank object element of the retrieved blank data, and converts a question intention to ask a value of truth or falsehood in the input sentence to the question intention element of the retrieved blank data.

6. The natural language dialogue apparatus according to claim 5,
   wherein said question data conversion means retrieves the blank data in order of the priority if a plurality of the blank data corresponding to the coincided retrieval key element are stored in said blank data memory means.

7. The natural language dialogue apparatus according to claim 2,
   wherein the retrieval key element is a verb as a movement element in the input sentence.

8. The natural language dialogue apparatus according to claim 7,
   wherein said problem solution means previously stores a plurality of set course data from a start point to an arrival point along a driving route, each set course data including a plurality of slots of each kind necessary for actual driving on the driving route, one of the plurality of slots being the movement element.

9. The natural language dialogue apparatus according to claim 8,
   wherein said problem solution means retrieves the set course data of which the movement element and at least one slot are equally included in the question data, and extracts another slot that is the same kind as the blanked slot included in the question data from the retrieved set course data as the solution.

10. The natural language dialogue apparatus according to claim 9,
    wherein said question data conversion means blanks a slot of another kind in the question data if said problem solution means can not retrieve the set course data, and
    wherein said problem solution means retrieves the set course data of which the movement element and at least one slot are equally included in the question data in which the slot of another kind is blanked.

11. The natural language dialogue apparatus according to claim 9,
    wherein said problem solution means generates the response including the solution without the value of truth or falsehood by referring to the question intention element in the question data if said problem solution means can retrieve the set course data, and
    wherein said problem solution means generates the response representing the value of falsehood in the input sentence if said problem solution means can not retrieve the set course data.

12. A method for communicating by natural language, comprising the steps of:
    analyzing an input sentence of natural language from a user;
    storing a plurality of blank data each including a retrieval key element and a blank object element for a question to ask a value of truth or falsehood, the blank object element representing a kind of object to be recognized;
    deciding whether the input sentence is a question to ask the value of truth or falsehood;
    estimating an object to be recognized in the input sentence if the input sentence is the question to ask the value of truth or falsehood;
    retrieving the blank data of which the retrieval key element is included in the input sentence from the stored blank data;
    converting the input sentence to question data in which the object is blanked by referring to the blank object element of the retrieved blank data;
    retrieving a solution for the object blanked in the question data; and
    generating a response in which the solution is included and an answer for the value of truth or falsehood is not included.

13. The method according to claim 12,
further comprising the step of:
  storing a plurality of the blank data each including a question intention element and the blank object element corresponding to the retrieval key element, the retrieval key element representing a slot of arbitrary kind in the input sentence, the question intention element representing a kind of data necessary for the user in relation to the blank object element.

14. The method according to claim 13,
further comprising the step of:
  storing a plurality of the blank data corresponding to the same retrieval key element in order of priority, each blank data including the question intention element and the blank object element.

15. The method according to claim 14,
further comprising the step of:
  dividing the input sentence into a plurality of slots of each kind if the input sentence is the question to ask the value of truth or falsehood.

16. The method according to claim 15,
further comprising the steps of:
  retrieving the blank data corresponding to the retrieval key element which coincides with one slot in the input sentence from the stored blank data;
  blanking another slot in the input sentence that is the same kind as the blank object element of the retrieved blank data; and
  converting a question intention to ask a value of truth or falsehood in the input sentence to the question intention element of the retrieved blank data.

17. The method according to claim 16,
further comprising the step of:
  retrieving the blank data in order of the priority if a plurality of the blank data corresponding to the coincided retrieval key element are stored.

18. The method according to claim 13,
wherein the retrieval key element is a verb as a movement element in the input sentence.

19. The method according to claim 18,
further comprising the step of:
  previously storing a plurality of set course data from a start point to an arrival point along a driving route, each set course data including a plurality of slots of each kind necessary for actual driving on the driving route, one of the plurality of slots being the movement element.

20. The method according to claim 19,
further comprising the steps of:
  retrieving the set course data of which the movement element and at least one slot are equally included in the question data; and
  extracting another slot that is the same kind as the blanked slot included in the question data from the retrieved set course data as the solution.

21. The method according to claim 20,
further comprising the steps of:
  blanking a slot of another kind in the question data if the set course data is not retrieved; and
  retrieving the set course data of which the movement element and at least one slot are equally included in the question data in which the slot of another kind is blanked.

22. The method according to claim 20,
further comprising the steps of:
  generating the response including the solution without the value of truth or falsehood by referring to the question intention element in the question data if the set course data is retrieved; and
  generating the response representing the value of falsehood in the input sentence if the set course data is not retrieved.

23. A computer readable memory containing computer readable instructions, comprising:
  instruction means for causing a computer to analyze an input sentence of natural language from a user;
  instruction means for causing a computer to store a plurality of blank data each including a retrieval key element and a blank object element for a question to ask a value of truth or falsehood, the blank object element representing a kind of object to be recognized;
  instruction means for causing a computer to decide whether the input sentence is a question to ask the value of truth or falsehood;
  instruction means for causing a computer to estimate an object to be recognized in the input sentence if the input sentence is the question to ask the value of truth or falsehood;
  instruction means for causing a computer to retrieve the blank data of which the retrieval key element is included in the input sentence from the stored blank data;
  instruction means for causing a computer to convert the input sentence to question data in which the object is blanked by referring to the blank object element of the retrieved blank data;
  instruction means for causing a computer to retrieve a solution for the object blanked in the question data; and
  instruction means for causing a computer to generate a response in which the solution is included and an answer for the value of truth or falsehood is not included.

24. A natural language dialogue apparatus, comprising:
  an input analysis unit configured to analyze an input sentence of natural language from a user;
  a blank data memory configured to store a plurality of blank data each including a retrieval key element and a blank object element for a question to ask a value of truth or falsehood, the blank object element representing a kind of object to be recognized;
  a question data conversion unit configured to decide whether the input sentence is a question to ask the value of truth or falsehood, to estimate an object to be recognized in the input sentence if the input sentence is the question to ask the value of truth or falsehood, to retrieve the blank data of which the retrieval key element is included in the input sentence from said blank data memory, and to convert the input sentence to question data in which the object is blanked by referring to the blank object element of the retrieved blank data; and
  a problem solution unit configured to retrieve a solution for the object blanked in the question data and to generate a response in which the solution is included and an answer for the value of truth or falsehood is not included.

25. The natural language dialogue apparatus according to claim 24,
wherein said blank data memory stores a plurality of the blank data each including a question intention element and the blank object element corresponding to the retrieval key element, the retrieval key element representing a slot of arbitrary kind in the input sentence, the question intention element representing a kind of data necessary for the user in relation to the blank object element.

26. The natural language dialogue apparatus according to claim 25, wherein said blank data memory stores a plurality of the blank data corresponding to the same retrieval key element in order of priority, each blank data including the question intention element and the blank object element.

27. The natural language dialogue apparatus according to claim 26, wherein said question data conversion unit divides the input sentence into a plurality of slots of each kind if the input sentence is the question to ask the value of truth or falsehood.

28. The natural language dialogue apparatus according to claim 27, wherein said question data conversion unit retrieves the blank data corresponding to the retrieval key element that coincides with one slot in the input sentence from said blank data memory, blanks another slot in the input sentence of which the kind is the same as the blank object element of the retrieved blank data, and converts a question intention to ask a value of truth or falsehood in the input sentence to the question intention element of the retrieved blank data.

29. The natural language dialogue apparatus according to claim 28, wherein said question data conversion unit retrieves the blank data in order of the priority if a plurality of the blank data corresponding to the coincided retrieval key element are stored in said blank data memory.

30. The natural language dialogue apparatus according to claim 25, wherein the retrieval key element is a verb as a movement element in the input sentence.

31. The natural language dialogue apparatus according to claim 30, wherein said problem solution unit previously stores a plurality of set course data from a start point to an arrival point along a driving route, each set course data including a plurality of slots of each kind necessary for actual driving on the driving route, one of the plurality of slots being the movement element.

32. The natural language dialogue apparatus according to claim 31, wherein said problem solution unit retrieves the set course data of which the movement element and at least one slot are equally included in the question data, and extracts another slot that is the same kind as the blanked slot included in the question data from the retrieved set course data as the solution.

33. The natural language dialogue apparatus according to claim 32, wherein said question data conversion unit blanks a slot of another kind in the question data if said problem solution unit can not retrieve the set course data, and wherein said problem solution unit retrieves the set course data of which the movement element and at least one slot are equally included in the question data in which the slot of another kind is blanked.

34. The natural language dialogue apparatus according to claim 32, wherein said problem solution unit generates the response including the solution without the value of truth or falsehood by referring to the question intention element in the question data if said problem solution unit can retrieve the set course data, and wherein said problem solution unit generates the response representing the value of falsehood in the input sentence if said problem solution unit can not retrieve the set course data.

* * * * *